Oct. 13, 1931.   W. C. RAUBE   1,827,671
CONTROL SYSTEM FOR ELECTRIC MOTORS
Filed Nov. 28, 1928
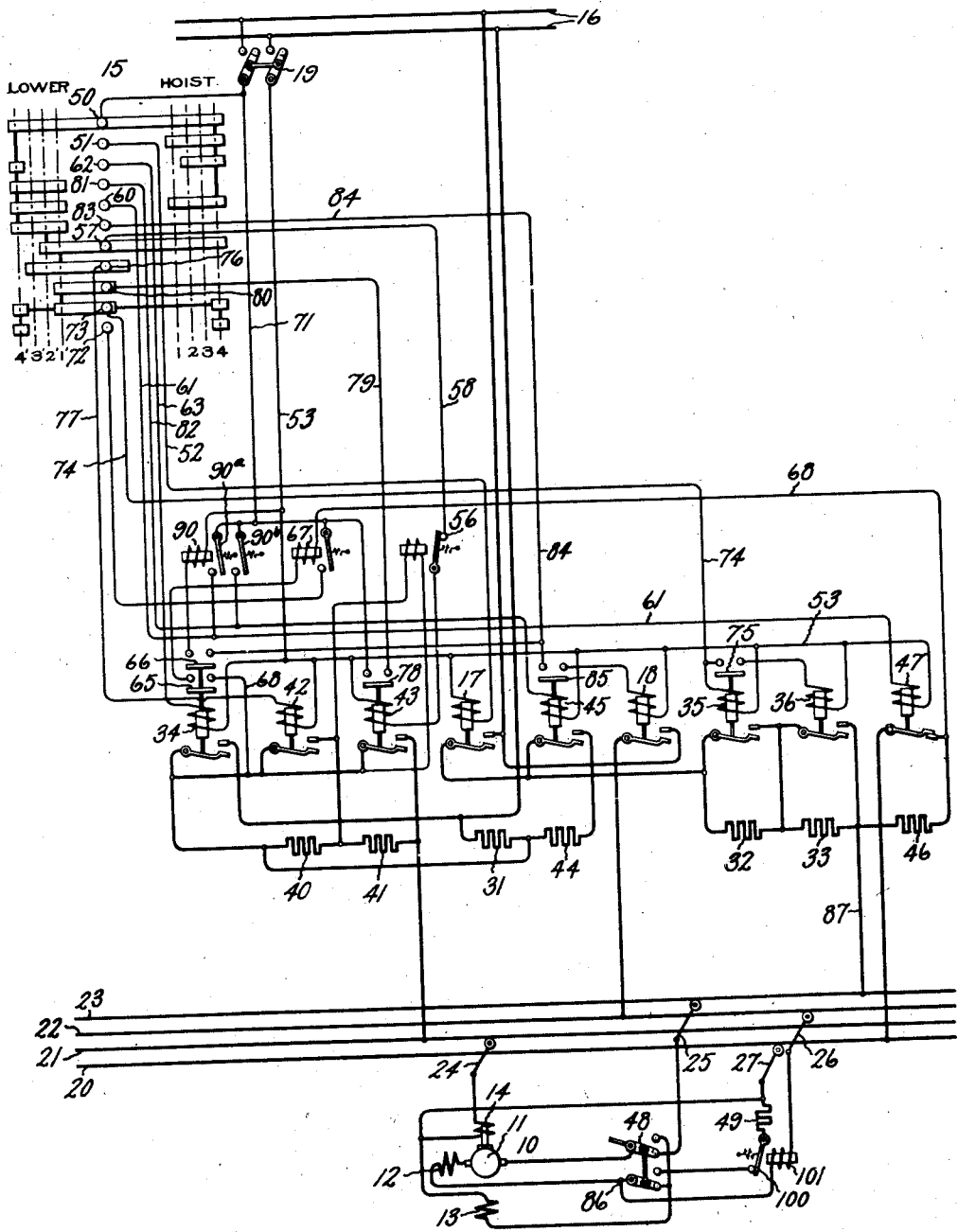
Inventor:
William C. Raube,
by Charles E. Tullar
His Attorney.

Patented Oct. 13, 1931

1,827,671

UNITED STATES PATENT OFFICE

WILLIAM C. RAUBE, OF SCHENECTADY, NEW YORK, ASSIGNOR TO GENERAL ELECTRIC COMPANY, A CORPORATION OF NEW YORK

CONTROL SYSTEM FOR ELECTRIC MOTORS

Application filed November 28, 1928. Serial No. 322,520.

My invention relates to control systems for electric motors, and has for its object the provision of a control system for an electric motor whereby the motor may be started and stopped and in general controlled in a reliable and efficient manner.

Although it obviously has other applications, my invention is particularly applicable to a reversing motor intended to operate a hoist.

In the operation of a hoist, it is common practice to control the lowering operation by causing the motor either to drive the load as a motor or to brake the load as a generator, the proportions of the load determining the action of the motor. A direct current series motor is ordinarily used for hoisting purposes because of its good starting characteristics and because it adapts itself very well to dynamic braking, that is, it has such characteristics that it may be conveniently controlled to be operated as a generator under the influence of an over-hauling load. When hoisting, the motor is connected in the normal manner with the armature, series field and speed control resistors all connected in series. The connections for lowering, however, are such as practically to convert the series field into a shunt field by placing it across the power source. Suitable resistance, connected in series with the series field and the motor armature so as to form a dynamic braking circuit, is properly regulated to control the motor speed during the lowering operation.

It is also common practice to provide suitable control means for establishing a second or auxiliary dynamic braking circuit in the event the motor operates the hoist too far in the hoisting direction. This dynamic braking circuit is often controlled by a limit switch which operates to establish the braking circuit in response to movement of the hoist beyond the desired position. Thus in the event of over-travel, the motor will be brought to rest quickly under the influence of dynamic braking.

More or less difficulty has been experienced as a result of this operation because oftentimes the motor when energized, with the auxiliary dynamic braking circuit established would not develop sufficient torque to lower an empty hook or a hook lightly loaded out of the limit switch position. This failure to respond is due both to the characteristics of the lowering circuit which provides a relatively high resistance in series with the motor field and armature circuits, and to the auxiliary dynamic braking circuit which is established in event of overtravel and which provides a parallel path of relatively low resistance around the motor field and armature.

In one of its aspects, my invention contemplates the provision of control means for the hoist operating motor whereby it will develop sufficient torque to operate the hoist rapidly in a lowering direction even though the auxiliary dynamic braking circuit has been established and its control means, as for instance, the limit switch referred to above, has not been restored to its normal operative position.

In carrying my invention into effect in one form thereof, I provide control means for the auxiliary dynamic braking circuit so that this braking circuit, which will have been established by overtravel when the current through the motor armature is reversed to cause the motor to operate in a lowering direction.

For a more complete understanding of my invention reference should be had to the accompanying drawing in which the single figure is a diagrammatical representation of the system of control embodying my invention.

Referring to the drawing I have shown my invention in one form as applied to a direct current series motor employed to operate the hoist of a traveling crane. As shown, a direct current motor 10, having an armature 11, a commutating field 12 and a field winding 13 connected in series relation with the armature 11, is provided to operate the hoist of a traveling crane, not shown. The motor 10 is further provided with a suitable electrically operated brake 14, shown as an electro-magnetic brake which when energized is arranged to release the brake and when deenergized to apply the brake. The operating coil of this brake is connected in series with the motor armature and thus is arranged to be energized to release the brake when the motor power circuit is completed and to be deenergized to apply the brake when the motor power circuit is interrupted.

The motor 10 is arranged to be controlled by means of a suitable reversing master switch 15 which in a hoisting control system will be a drum controller remotely located with respect to the motor to be operated. The drum controller 15 is arranged to control the motor 10 as to its direction of operation and as to its speed through a plurality of directional and speed controlling contactors.

As shown, the motor 10 is arranged to be connected to a suitable source of direct current supply 16 for the up or hoisting direction of the hoist by means of the directional contactor 17, and to be connected to the source of supply 16 for the down or lowering direction of the hoist by means of the directional contactor 18. Each of these contactors controls contacts in the main motor circuit and, as well understood are energized to cause the motor to operate in the proper direction in response to movement of the controller 15 in the corresponding proper direction. Thus, movement of the controller toward the left, as viewed in the figure, will energize the operating coil of the hoisting contactor 17 so as to close the hoisting operating circuit for the motor 10, and movement of the controller 15 towards the right, as viewed in the figure, will energize the operating coil of the lowering contactor 18 so as to close the lowering operating circuit for the motor. A suitable control switch 19 is inserted between the drum controller 15 and the supply source 16.

As shown, suitable trolley conductors 20, 21, 22 and 23 are provided for the traveling crane so that the crane may be conveniently moved longitudinally with respect to its supporting rails, not shown. Suitable trolleys 24, 25, 26 and 27 are provided to engage the trolley conductors 21, 23, 22 and 20 respectively whereby operating circuits for the hoist operating motor 10 may be completed.

It will be understood that the motor 10 operates as a pure series motor in the hoisting direction, the motor being connected in the normal manner with the armature 11, the commutating field 12, the series field 13, the operating coil of the brake 14 and suitable accelerating and speed controlling resistors all connected in series. However, in the lowering direction, the motor is caused to operate as a shunt motor provided with a suitable dynamic braking circuit, resistors being provided for controlling the motor speed by varying the field strength and armature current. It will be further understood that the controller 15 operates to control the motor as a series motor while hoisting, effects the transformation to the shunt motor and establishes a suitable dynamic braking circuit for the motor for lowering operation and further controls the motor speed while lowering. The master switch or the controller 15 effects this complete control of the motor by means of the directional contactors 17 and 18 together with a plurality of other contactors which operate to control resistors connected in suitable circuits.

As shown, suitable accelerating resistors 31, 32, and 33 are connected in series with the motor armature circuit and with the series field 13 during the hoisting operation. These resistors 31, 32 and 33 are placed under the control of the accelerating contactors 34, 35, and 36 respectively. Excitation resistors 40 and 41 connected in series with the motor field winding 12 are placed under the control of the excitation contactors 42 and 43 respectively. A dynamic braking resistor 44 which is arranged to be connected in multiple with the motor armature 11 and series field 13 during the lowering operation is placed under the control of the dynamic braking contactor 45. An emergency dynamic braking resistor 46, the purpose of which will be hereinafter pointed out, is placed under the control of the normally closed emergency dynamic braking contactor 47.

Suitable means are provided to interrupt the motor hoisting power circuit in the event the hoist overtravels in its hoisting direction and at the same time establish an auxiliary dynamic braking circuit for the motor so as to bring it quickly to rest. As shown, I provide a suitable dynamic braking hoist limit switch 48 for this purpose. This switch may be tripped in any suitable manner in case of overtravel and operates when tripped to interrupt the motor power circuit and at the same time insert the auxiliary dynamic braking resistor 49 around the motor armature 11 and the series field 13.

With the above understanding of the general arrangement of the control systems, the operation of the system thus far described is as follows: Let it be assumed that the controller has been moved to the first position 1 in the hoisting direction, that is toward the left, as viewed in the figure. It will be observed that an energizing circuit for the hoisting contactor 17 will be completed from the upper conductor of the supply source 16 through the controller finger 50, the finger 51, the conductor 52, the operating coil of the contactor 17 and thence by the conductor 53 to the lower conductor of the supply source. The hoisting contactor 17 will then close so as to close a power circuit for the motor 10 to operate the hoist in the hoisting direction. This power circuit may be traced from the upper supply conductor through the contacts of the contactor 17, the accelerating resistors 32 and 33, the trolley conductor 23, the trolley 25, the limit switch 48, the motor armature 11, the commutating field 12, the series field 13, the operating coil of the brake 14, the trolley 24, the trolley conductor 21, the closed contactor 43, and thence through the resistor 31 to the lower conductor of the supply source.

It will be understood that the normally closed decelerating relay 56 will have completed an energizing circuit for the excitation contactor 43 from the controller finger 57 through the conductor 58, the relay 56, the operating coil of the contactor 43 and thence through the conductor 53 to the lower conductor of the supply source. Thus, the contactor 43 will have been closed to short circuit the resistors 40 and 41 when the controller 15 was in its neutral position and will remain closed during the hoisting operation.

Thus, by movement of the controller to the first hoisting position, the motor 10 will have its armature 11 and field winding 13 connected in series across the supply source 16 in series with the resistors 31, 32 and 33. The motor will start up, therefore, with limited excitation and armature current. It will be observed that an energizing circuit for the emergency dynamic braking contactor 47 will be completed from the upper supply conductor through the controller finger 50, the finger 60, the conductor 61, the operating coil of the contactor 47 and thence through the conductor 53 to the lower supply conductor. Thus, the circuit through the auxiliary dynamic braking resistor 46 will be interrupted.

Movement of the control to its second hoisting position 2 effects the energization of the contactor 34, the energizing circuit for which may be traced from the upper conductor of the supply source 16 through the controller finger 50, the finger 62, the conductor 63, the operating coil of the contactor 34 and thence by the conductor 53 to the lower conductor of the supply source. The contactor 34 is thus closed to shunt the resistor 31 from the motor supply circuit whereby the motor torque is caused to increase accordingly.

It will be observed that when the contactor 34 closes, the interlocks 65 and 66 operated thereby likewise will be closed. The interlock 65 controls an energizing circuit for the operating coil of the accelerating relay 67 and when closed connects the operating coil of this relay across the motor armature by means of the conductor 68. This operation, however, effects no resulting control upon the motor at this time but makes it possible to close the accelerating contactors 35 and 36 upon movement of the controller to its fourth hoisting position. It will be understood that the relay 67 provides counter electromotive force control of the cointactor 35, which will be closed on the fourth position.

Movement of the controller to its third hoisting position 3 effects no resulting control upon the motor but upon being moved to its fourth position 4 effects the closing of the accelerating contactors 35 and 36. It will be observed that when the controller is in its fourth position, an energizing circuit for the contactor 35 will be completed from the upper supply conductor through the conductor 71, the relay 67 which will have been energized by counter electromotive force on the second position of the controller, the finger 72 of the controller, the finger 73, the conductor 74, the operating coil of the contactor 35 and thence through the conductor 53 to the lower conductor of the supply source. The contactor 35, therefore, operates to shunt the resistor 32 from the motor armature circuit and further, operates to close its associated interlock 75 which controls an energizing circuit for the contactor 36. It will be observed that this energizing circuit will be completed from the conductor 74 through the interlock 75, the operating coil of the contactor 36 and thence by the conductor 53 to the lower conductor of the supply source. Thus, the contactor 36 will operate in turn to shunt the resistor 33 from the motor armature circuit.

Thus, the drum controller will have been moved from its neutral to the fourth hoisting position and in consequence, the hoisting contactor 17 will have been closed so as to energize the motor to operate in a hoisting direction, and the resistors 31, 32 and 33 will have been successively short circuited. As a result, the voltage impressed upon the motor armature will have been successively increased and the motor will be operating to develop its maximum torque.

When the drum controller 15 is returned from the final hoisting position to the first hoisting position, the hoisting contactor 17, the motor excitation contactor 43 and the dynamic braking contactor 47 will remain energized but the accelerating contactors 34, 35 and 36 will be deenergized thus operating to re-insert the resistors 31, 32 and 33 in the motor armature circuit. The speed of the motor will be reduced by reason of the re-inclusion of these resistors in the motor circuit.

In case the controller 15 is returned to its neutral position, the hoisting contactor 17 and the auxiliary dynamic braking contactor 47 will be deenergized, the contactor 17 being opened and the contactor 47 being closed. Thus, the motor operating circuit will be interrupted and the motor armature will be short circuited through the series field 13 and the emergency dynamic braking resistor 46. It will be observed that the electromagnetic brake 14 which will have been deenergized by the opening of the motor armature circuit will bring the motor 10 to rest.

It will be observed that when the controller 15 is in its neutral position and the control switch 19 closed, the contactor 42 will be energized to close its contacts by a circuit completed from the upper conductor of the supply source through the controller finger 50, the finger 76, the conductor 77, the operating coil of the contactor 42 and thence through the conductor 53 to the lower supply conductor. The contactor 43 will be energized to close its contacts through the normally closed relay 56, as described above. The contactors 35 and 36 will be energized to close their contacts when the controller is moved to its neutral position. The energizing circuit for the contactor 35 will be completed from the upper supply conductor through the conductor 71, the interlock 78 which will have been closed by the contactor 43, the conductor 79, the controller finger 80, the finger 73, the conductor 74, the operating coil of the contactor 35 and thence through the conductor 53 to the lower supply conductor. That for the contactor 36 will then be closed through the interlock 75 which will have been closed by the contactor 35.

In order to effect a lowering operation of the hoist, the drum controller 15 will be thrown toward the right, as viewed in the figure. Let it be assumed that the controller has been moved to its first lowering position 1'. It will be observed that when the controller has been so moved, an energizing circuit for the dynamic braking contactor 45 will be completed from the upper conductor of the supply source 16 through the finger 50 of the controller, the finger 81, the conductor 82, the operating coil of the contactor 45, and thence to the lower conductor of the supply source through the conductor 53. As a result, the contactor 45 will be closed whereby the dynamic braking resistor 44 will be connected in series with the resistors 32 and 33, the motor armature 11, the commutating field 12, the series field 13, and the motor excitation resistors 40 and 41. It will also be observed that the lowering contactor 18 will have been closed since the energizing circuit for its operating coil will be completed from the upper supply conductor through the controller finger 50, the finger 83, the conductor 84, the interlock 85, which will have been closed by the closing of the contactor 45, the operating coil of the lowering contactor 18 and thence through the conductor 53 to the lower supply conductor.

Thus, the closing of the contactors 45 and 18 will have established a split circuit for the motor so that it may operate as a motor to drive a light load or as a braking generator to brake a heavy load. This split circuit may be traced from the upper conductor of the supply source 16 through the closed lowering contactor 18, the trolley conductor 22, the trolley 26, and thence to a point, designated by the ordinal 86, between the commutating field 12 and the series field 13. From the point 86 the circuit may be traced in one direction through the commutating field 12, the motor armature 11, the limit switch 48, the trolley 25, the trolley conductor 23, the conductor 87, the resistors 33 and 32, the closed contactor 45, the dynamic braking resistor 44 and thence through the resistor 31 to the lower conductor of the supply source 16. From the point 86, the split circuit may be traced in the other direction through the limit switch 48, the series field 13, the operating coil of the brake 14, the trolley 24, the trolley conductor 21, the resistors 40 and 41 and thence through the resistor 31 to the lower supply conductor. Thus, the motor may operate either as a motor to operate a light load or as a brake to brake a heavy load.

It will be observed that with the drum controller in its first lowering position 1', an energizing circuit will be completed for the contactor 42 from the upper conductor of the supply source through the controller finger 50, the finger 76, the conductor 77, the operating coil of the contactor 42 and thence through the conductor 53 to the lower conductor of the supply source. Likewise it will be observed that an energizing circuit for the excitation contactor 43 will be completed from the upper supply conductor, the controller finger 50, the finger 57, the conductor 58, the normally closed relay 56, the operating coil of the contactor 43 and thence through the conductor 53 to the lower conductor of the supply source. It will be understood that the operating coil of the relay 56 will not be energized to open the relay at this time since the resistor 40, across which it is connected, will be shunted by the contacts 42.

The contactor 43 controls an energizing circuit for the contactor 35 and the contactor 35 likewise controls an energizing circuit for the contactor 36. Thus, when the contactor 43 is closed, an energizing circuit for the contactor 35 will be completed from the upper supply conductor through the conductor 71, the interlock 78 which will have been closed by the contactor 43, the conductor 79, the controller finger 80, the finger 73, the conductor 74, the operating coil of the contactor 35 and thence through the conductor 53 to the lower supply conductor. The energizing circuit for the contactor 36 will be completed through the interlock 75 which will have been closed by the contactor 35.

Furthermore, the contactor 47 will be energized to open its contacts by an energizing circuit from the upper conductor of the supply source through the controller finger 50, the finger 60, the conductor 61, the operating coil of the contactor 47 and thence through the conductor 53 to the lower conductor of the supply source.

As a further result of the movement of the controller to its first lowering position, therefore, the contactors 42, 43, 35 and 36 will have been closed and the contactor 47 will have been opened. Thus, the accelerating resistors 32 and 33 will have been removed from the motor armature circuit, the excitation resistors 40 and 41 likewise will have been removed from the motor circuit and the emergency dynamic braking circuit through the resistor 46 will have been interrupted.

Consequently the motor 10, when operating as a motor, will be in effect a shunt machine, the series field 13 being connected across the motor armature. As a result, the motor will give motor torque at low speed. When operating as a generator for the purpose of dynamic braking the motor armature 11, the field 13 and the resistor 44 will be connected in a braking circuit and the motor will give dynamic braking torque at a slightly higher speed.

It is believed unnecessary for the purpose of understanding this invention to describe in detail the various motor operating conditions effected by throwing the controller 15 to its successive lowering positions. It is believed that those skilled in the art will readily understand from the following brief description of the operation of the controlling contactors, that the motor speed in the lowering direction will be suitably controlled by varying the field strength and the motor armature current through the agency of the resistors connected in the field and armature circuits, respectively.

Thus, the contactors 35 and 36 will be opened when the controller is being moved to its second lowering position 2′, since the controller segment associated with the finger 73 will be moved off of this finger during this operation. As a result, the resistors 32 and 33 will be inserted in the motor armature circuit. The motor speed, therefore, will be slightly reduced when a positive torque is required for driving a light hook down, while on the other hand the motor speed will be increased when it is operating under the influence of an overhauling load.

In the third lowering position 3′ of the controller, the controller segment associated with the finger 57 will have moved away from this finger and thus will have effected the de-energization of the contactor 43, which thereupon will have been opened to insert the resistor 41 in the dynamic braking circuit and the field excitation circuit. This action decreases the field excitation circuit and thus increases the motor speed for both power torque and dynamic braking torque.

When moving to its fourth lowering position 4′, the controller effects the opening of the contactor 42 and the closing of the contactors 34, 35 and 36. Thus in this position of the controller, the controller segment associated with the finger segment 76 will have disengaged this finger and the circuit for the contactor 42 will have been interrupted. The finger 62 of the controller will have closed an energizing circuit for the contactor 34, which in turn will have placed the relay 67 across the armature circuit so that it will have been energized to close. The controller fingers 72 and 73 thereupon will have closed an energizing circuit for the contactor 35 and the contactor 35 in turn will have closed an energizing circuit for the contactor 36. This action shunts the resistors 31, 32 and 33 and puts the motor field 13 directly across the line with the resistors 40 and 41 in series with it, the motor armature at the same time being connected across the line with the resistor 44 in series with it. This connection provides shunt generator characteristics for lowering the load, thus providing regenerative braking lowering at high speed.

It will be observed that when the contactor 34 closes in response to movement of the controller to its fourth lowering position, it will close its associated interlock 66. This connects the operating coil of the dynamic braking time relay 90 in an energizing circuit, which may be traced from the upper conductor of the supply source 16 through the controller finger 50, the finger 83, the conductor 84, the interlock 66, the operating coil of the relay and thence through the conductor 53 to the lower supply conductor. The relay will then close its associated contacts 90a and 90b for a purpose which will hereinafter be pointed out. Likewise, it will be observed that when the contactor 42 opened in response to movement of the controller to its fourth lowering position, the operating coil of the relay 56, which is connected in parallel with the resistor 40, will be energized whereby the relay will open.

When decelerating from full lowering speed, the master controller 15 will be returned successively to its third, second and first lowering positions and thence to its neutral position. When returned to its third position, the contactors 34, 35 and 36 will open immediately, and the contactor 42 will close to short circuit the resistor 40. Closing of the contactor 42 short circuits the operating coil of the relay 56 and provides that the relay close after a predetermined time. Moving the controller to the second lowering position causes the contactor 43 to close after the time interval governed by the relay 56, which action short circuits the resistor 41. Moving the controller to the first lowering position causes the contactor 35 to close and this contactor in turn through its associated interlock 75 causes the contactor 36 to close. Thus, the resistors 32 and 33 will be short circuited. Moving the master controller to its neutral position causes the lowering contactor 18 to open, causes the contactor 45 to open and further causes the contactor 47 to close so as to provide a dynamic braking circuit through the resistor 46 to assist the solenoid brake 14.

The time relay 90 which, as described, was energized to close its associated contacts 90a and 90b, upon the closing of the contactors 34, is provided to protect the electromagnetic brake 14. It will be observed that the relay 90 when closed operates to complete energizing circuits for the dynamic braking contactors 45 and 47. Thus, when decelerating from the fourth lowering position to the neutral position, the brake 14 will remain open until dynamic braking action has materially decreased the motor speed. As a result undue wear on the brake is eliminated.

It will be observed that in the event the hoist overtravels in its hoisting direction and the limit switch 48 be operated so as to engage its normally open contacts in consequence thereof, the main motor operating circuit which may be traced through the trolley 25 will be interrupted and simultaneously therewith the resistor 49 will be connected across the motor armature and series field. This operation of the limit switch in addition to connecting the resistor 49 across the motor armature will reverse the armature with respect to the field. As a result of this action the motor will be brought to rest quickly by dynamic braking action.

It will also be observed, however, that when the controller is moved to a lowering position, as for instance the first lowering position, the motor armature and series field will be connected across the power source 16 in series with the high resistor 31 and in parallel with the relatively low resistor 49. It will be obvious that the armature and field current will be reduced not only by the high resistor 31 but also will be materially reduced because of the parallel path through the relatively low resistor 49 established by the operation of the limit switch.

These circuit conditions will persist until the limit switch has been reset. As a result of these conditions it often happens that the motor will not develop sufficient torque to lower an empty hook or a hook lightly loaded out of the limit switch position or if it will develop sufficient torque will not move the hook out of this position until after the lapse of an appreciable interval of time.

In order to overcome this difficulty I provide suitable control means operative in response to movement of the controller to a lowering position. As shown, I provide a contactor 100 connected in series with the resistor 49, that is, connected in the parallel path which has been established around the motor by the operation of dynamic braking limit switch 48. This contactor is normally biased to its closed position by any suitable means, as for instance a spring, and is moved to an open position by any suitable means operated in response to the energization of the motor for a lowering movement. As shown, I connect a suitable contactor operating coil 101 in series with the conductor leading from the trolley 26, that is I connect the coil in series with the power circuit which is energized in a lowering direction only.

In operation, let it be assumed that the hoist has been operated in its up direction to such a position that the limit switch 48 has been tripped. It will be understood that the power circuit which has been energized in the hoisting direction will have been interrupted and the auxiliary dynamic braking circuit through the resistor 49 will have been established. This operation will have brought the motor quickly to rest and in this condition of the system the controller may be operated to a lowering position. As has been described, upon movement of the controller to a lowering position, as for instance its first lowering position 1', a power circuit for the motor in the lowering direction will be established through the trolley 26. It will be observed that immediately upon completion of this power circuit, the contactor 100 will be opened under the influence of its operating coil 101.

As a result of this operation, the auxiliary dynamic braking circuit will be interrupted leaving the motor armature 11, the series field 13 and the resistor 31 connected in series across the power source 16. It will be observed that the resistor 31 now operates alone to limit the voltage impressed upon the motor armature and field and in consequence, the motor will develop sufficient torque to quickly lower the hoist out of the limit switch position.

It will be understood that when the limit switch is reset, the normal lowering circuit will be established and the motor will be further controlled in the normal manner.

It will be obvious that my invention may well be employed to advantage in any similar system of motor operation in which a suitable auxiliary dynamic braking circuit is established to bring the motor quickly to rest in the event of overtravel.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States, is:

1. A control system for an electric motor provided to operate a member in two directions comprising a reversing controller for said motor, means responsive to movement of said member to a predetermined limit of travel in one direction for interrupting the motor power circuit and for establishing a dynamic braking circuit for said motor so as to bring said motor rapidly to rest, means responsive to the operation of said reversing controller to establish a power circuit for said motor to move said member in the opposite direction for establishing a second dynamic braking circuit for said motor and control means for interrupting said first dynamic braking circuit when said controller is energized to effect the movement of said member in said opposite direction.

2. The combination with a hoist or the like, an electric motor for operating the hoist and a reversing controller therefor, of means including a limit switch at the hoisting limit of travel operative to open the motor hoisting power circuit and to establish a dynamic braking circuit for said motor, means responsive to the operation of said controller to establish a lowering power circuit for establishing a second dynamic braking circuit for said motor and means for interrupting said first dynamic braking circuit responsively to this operation of said controller.

3. The combination with a hoist or the like and an electric motor, provided with a series connected field winding, for operating the hoist, of a reversing controller for said motor, means responsive to the operation of said controller to establish a lowering power circuit for establishing a dynamic braking circuit for said motor, a limit switch at the hoisting limit of travel for opening the hoisting power circuit upon operation of said switch, a dynamic braking resistor for said motor, electrical connections controlled by said limit switch so that when said switch is operated in response to overtravel of said hoist in the hoisting direction said braking resistor is connected in a closed circuit with the motor armature and field winding and means for interrupting said closed circuit responsively to the operation of said controller to establish said lowering power circuit for said motor.

4. The combination with a hoist or the like, an electric motor for operating the hoist and a reversing controller for the motor, of means responsive to the operation of said controller to establish a lowering power circuit for establishing a dynamic braking circuit for said motor, a limit switch at the hoisting limit of travel for interrupting the hoisting power circuit upon being operated, a dynamic braking resistor for said motor, electrical connections controlled by the operation of said limit switch for connecting said resistor in a motor dynamic braking circuit upon the opening of said hoisting power circuit to bring said motor rapidly to rest and means operative to interrupt said dynamic braking circuit responsively to the operation of said reversing controller to establish a lowering power circuit for said motor.

5. The combination with a hoist or the like and an electric motor having a series connected field winding for operating the hoist, of a reversing controller for said motor having hoisting and lowering control positions, means responsive to the operation of said controller to a lowering position for establishing a lowering power circuit and a dynamic braking circuit for said motor, a limit switch at the hoisting limit of travel for opening the hoisting power circuit, an auxiliary dynamic braking resistance for said motor, electrical connections controlled by said limit switch whereby when said switch is operated in response to overtravel of said hoist in the hoisting direction said resistance is connected in a closed circuit with the motor armature and the series field thereby establishing an auxiliary dynamic braking circuit for said motor, a normally closed contactor included in said connections and an operating coil for said contactor connected to be energized in response to the operation of said controller to establish a lowering power circuit for said motor whereby said contactor is opened to interrupt said auxiliary dynamic braking circuit.

6. The combination with a hoist or the like and an electric motor for operating the hoist and a reversing controller for said motor of means responsive to the operation of said controller to a lowering position for establishing a lowering power circuit and a dynamic braking circuit for said motor, means responsive to the movement of said hoist to a predetermined limit of travel in the hoisting direction for interrupting the hoisting motor power circuit and for establishing an auxiliary dynamic braking circuit for said motor and control means dependent upon the completion of said lowering power circuit and said first dynamic braking circuit for interrupting said auxiliary dynamic braking circuit.

7. The combination with a hoist or the like and an electric motor for operating the hoist, said motor being provided with a series connected field winding, of a limit switch at the hoisting limit of travel for opening the hoisting power circuit upon operation of said switch, a dynamic braking resistor for said motor, electrical connections controlled by said limit switch so that when said switch is operated in response to overtravel of said hoist in the hoisting direction said braking resistor is connected in a closed circuit with the motor armature and field winding and electro responsive switching means for interrupting said closed circuit, said electro responsive switching means being connected in the lowering motor power circuit so that upon the energization of said circuit, said switching means is operated to interrupt said closed dynamic braking circuit.

In witness whereof, I have hereunto set my hand this 27th day of November, 1928.

WILLIAM C. RAUBE.